United States Patent [19]
Stoever

[11] Patent Number: 5,980,008
[45] Date of Patent: Nov. 9, 1999

[54] CASTER BASE FOR CABINETS

[75] Inventor: John Alvin Stoever, Cordova, Tenn.

[73] Assignee: Sandusky Cabinets, Inc.

[21] Appl. No.: 08/895,139

[22] Filed: Jul. 16, 1997

[51] Int. Cl.[6] .................................................. B60B 33/00
[52] U.S. Cl. .............................. 312/351.12; 312/351.11; 312/249.8; 280/79.11; 280/47.34
[58] Field of Search .......................... 312/351.11, 351.12, 312/249.8; 280/47.34, 79.11, 79.5; 108/55.1; 220/653, 628, 636

[56] References Cited

U.S. PATENT DOCUMENTS

| | | | |
|---|---|---|---|
| 1,207,279 | 12/1916 | Crum | 220/636 |
| 1,387,655 | 8/1921 | Shaw et al. | 220/636 |
| 1,723,085 | 8/1929 | Sippel | 280/79.11 X |
| 3,208,768 | 9/1965 | Hulbert | 280/79.11 X |
| 3,219,252 | 11/1965 | Fleming et al. | 108/55.1 X |
| 3,294,307 | 12/1966 | Munroe | 206/600 X |
| 3,879,053 | 4/1975 | Chvala | 280/79.11 X |
| 4,458,906 | 7/1984 | Lamson | 280/79.11 X |
| 4,503,973 | 3/1985 | Anderson | 206/600 X |
| 4,655,466 | 4/1987 | Hanaoka | 280/47.34 X |
| 4,838,178 | 6/1989 | Chriske et al. | 108/55.1 |
| 4,960,209 | 10/1990 | Tudor | 206/600 X |
| 5,605,344 | 2/1997 | Insalaco et al. | 280/47.35 X |
| 5,669,507 | 9/1997 | Pruitt, Jr. | 206/600 |

FOREIGN PATENT DOCUMENTS

| | | | |
|---|---|---|---|
| 2040728 | 10/1992 | Canada | 280/79.5 |
| 1481466 | 4/1969 | Germany | 280/79.11 |
| 0235029 | 10/1986 | Japan | 220/628 |
| 8005942 | 5/1982 | Netherlands | 280/79.11 |
| 1645197 | 4/1991 | U.S.S.R. | 220/636 |
| 708243 | 5/1954 | United Kingdom | 108/55.1 |

*Primary Examiner*—Peter M. Cuomo
*Assistant Examiner*—David E Allred
*Attorney, Agent, or Firm*—Wood, Herron & Evans LLP

[57] ABSTRACT

A caster base for a cabinet includes support plates and struts connecting the forward and rearward end of the support plates. The struts are disposed within the cabinet so that the cabinet bottom is integrated with and sandwiched between the struts and the support plates. Casters are mounted at each end of each support plate. The base structural elements thus all reside within the periphery of the cabinet or within the cabinet and are not visible to the outside casual observer. Thus, each base does not protrude from the periphery of the cabinet and can be used for any color of the same size cabinet, it not being necessary to paint the base in a color to match the cabinet. The cabinet bottom is strengthened against deformation during movement over rough surfaces and the struts of the base are configured to be fitted within the cabinet and to accommodate inwardly turned front corner structure.

17 Claims, 2 Drawing Sheets

CASTER BASE FOR CABINETS

FIELD OF THE INVENTION

This invention relates to rolling bases for cabinets and particularly to roller bases for supporting metal cabinets.

BACKGROUND OF THE INVENTION

In the past, it has been known to mount casters, wheels or rollers to cabinets so they can be rolled over a floor surface. Such cabinets are typically made of sheet metal, for example, and the casters support the base above the floor. Their mounting, usually at the cabinet bottom corners, is accompanied by several disadvantages. Since the cabinet construction is of relatively thin sheet metal and all the cabinet weight is concentrated or supported by casters at only the four corners, movement of a heavily loaded cabinet over a rough floor surface or an obstacle above the flat floor can cause distortion, perhaps permanently, of the cabinet's bottom, front, side or back structures. Where separate bases have been used to mount the casters and hold the cabinet, the base structure frequently extends outside or beyond the cabinet periphery. This is unsightly, at best. Extensions protrude undesirably.

Accordingly, it has been one objective of this invention to provide a caster base for cabinets wherein the base does not extend outside the cabinet periphery.

Another objective of the invention has been to provide an improved caster base for a cabinet which adds strength to the cabinet bottom and resists deformation of cabinet structure when the cabinet is heavily loaded or moved over a surface.

SUMMARY OF THE INVENTION

To these ends, in a preferred embodiment according to the invention, a caster base for a cabinet includes two caster support plates, a caster mounted proximate each end of the two support plates, and two support struts, each extending between two respective ends of the two support plates. According to the invention, the base components are not assembled together. Instead, the support struts are disposed inside the cabinet bottom or floor. The floor is sandwiched between the support plates at each floor side, and the struts extending across the floor from side to side at the front and rear thereof. Bolts extend through the struts, floor and plates to join the components in a strong, stiff, integrated structure, producing a very stiff overall caster base and cabinet bottom structure. Bolts extend upwardly through the plates floor and strut. Even heavy loads inside the cabinet or moving the cabinet over rough surfaces or obstacles does not deform or distort the cabinet bottom as it might where this base is not used.

Moreover, with the struts disposed inside the cabinet, they do not extend or project outside, and all components of the base are maintained within the periphery of the cabinet bottom, with no protrusions. This includes the support plates which are formed so they, as well, lie within the cabinet periphery.

In another aspect of the invention, the front of the cabinet is typically constructed by a formed angular construction of the front edge of each cabinet side. These define a door frame or jamb at the front edge. That edge is bent and folded to stiffen the front corners of the cabinet and to provide a secure frame for mounting the cabinet doors. When the configured corner extends all the way to the cabinet floor, it blocks off a portion of the floor and the front base strut cannot then extend-all the way to the cabinet side. In the rear, this is not usually a problem since the rear corners do not usually include a formed or bent corner structure. Accordingly, the front strut of the base is made shorter than the rear strut so that it extends across the front of the cabinet to proximate the formed corner structures but not past them. This strut is still secured to the forward or front ends of the support plates to unify the combined base and cabinet structure.

Accordingly, the invention provides an improved caster base for a cabinet, strengthening the cabinet against deformation and distortion, while remaining substantially hidden within the confines of the cabinet and without projecting beyond its periphery, even by the thickness of a base member. The overall appearance of the cabinet is thus not changed, and it is unnecessary to paint the base members or to paint them in the same color as the cabinet for appearance sake. The same bases can be used for each cabinet color for cabinets of the same size, reducing inventory considerably.

BRIEF DESCRIPTION OF THE DRAWINGS

These and other advantages and modifications will be even more readily understood from the following written description of a preferred embodiment of the invention, and from the drawings in which.

DETAILED DESCRIPTION OF THE INVENTION

Figure 1:
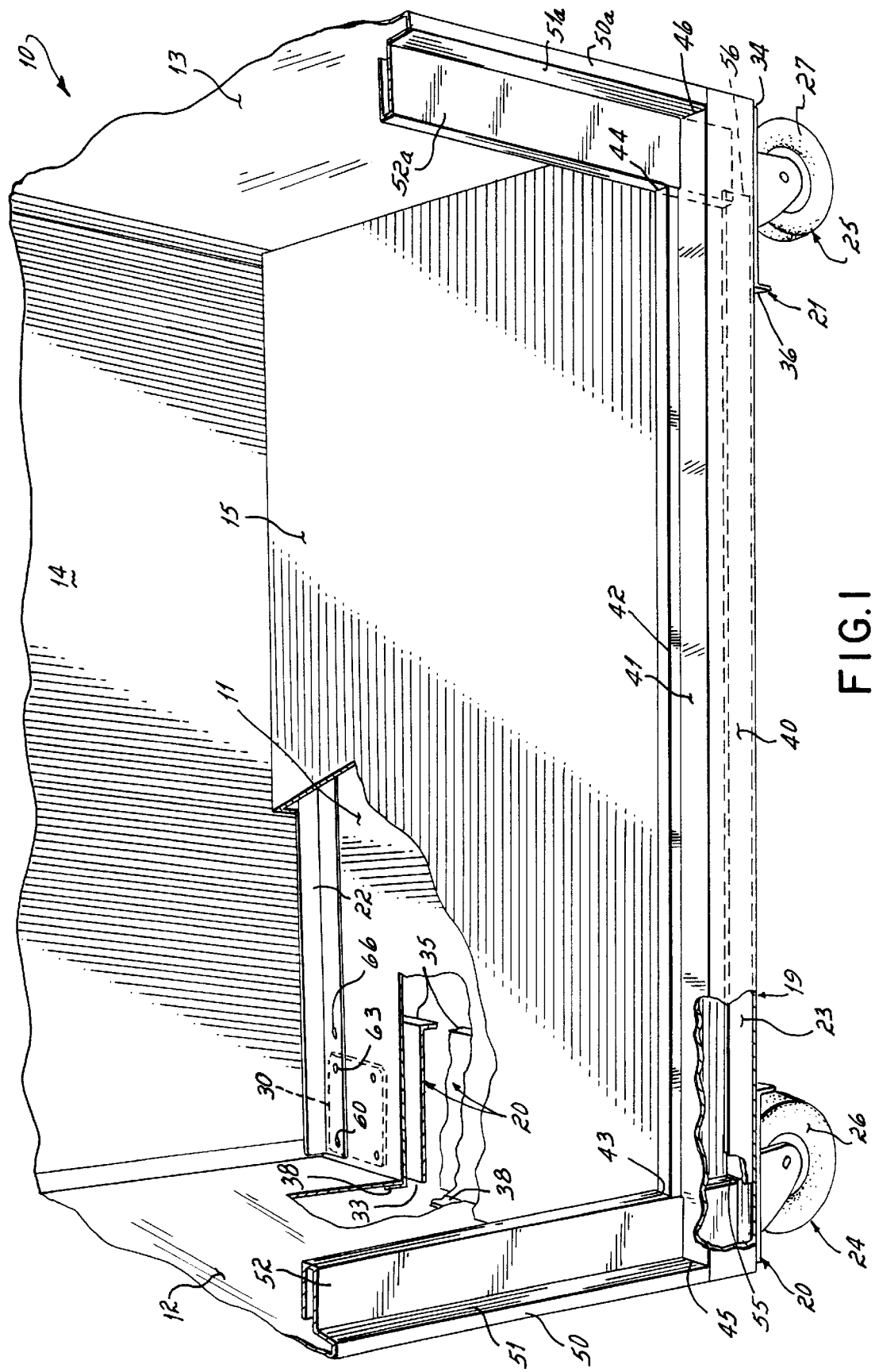
FIG. 1 is a perspective view partially broken away, looking inside the cabinet and showing its bottom and components of the base.
Figure 2:
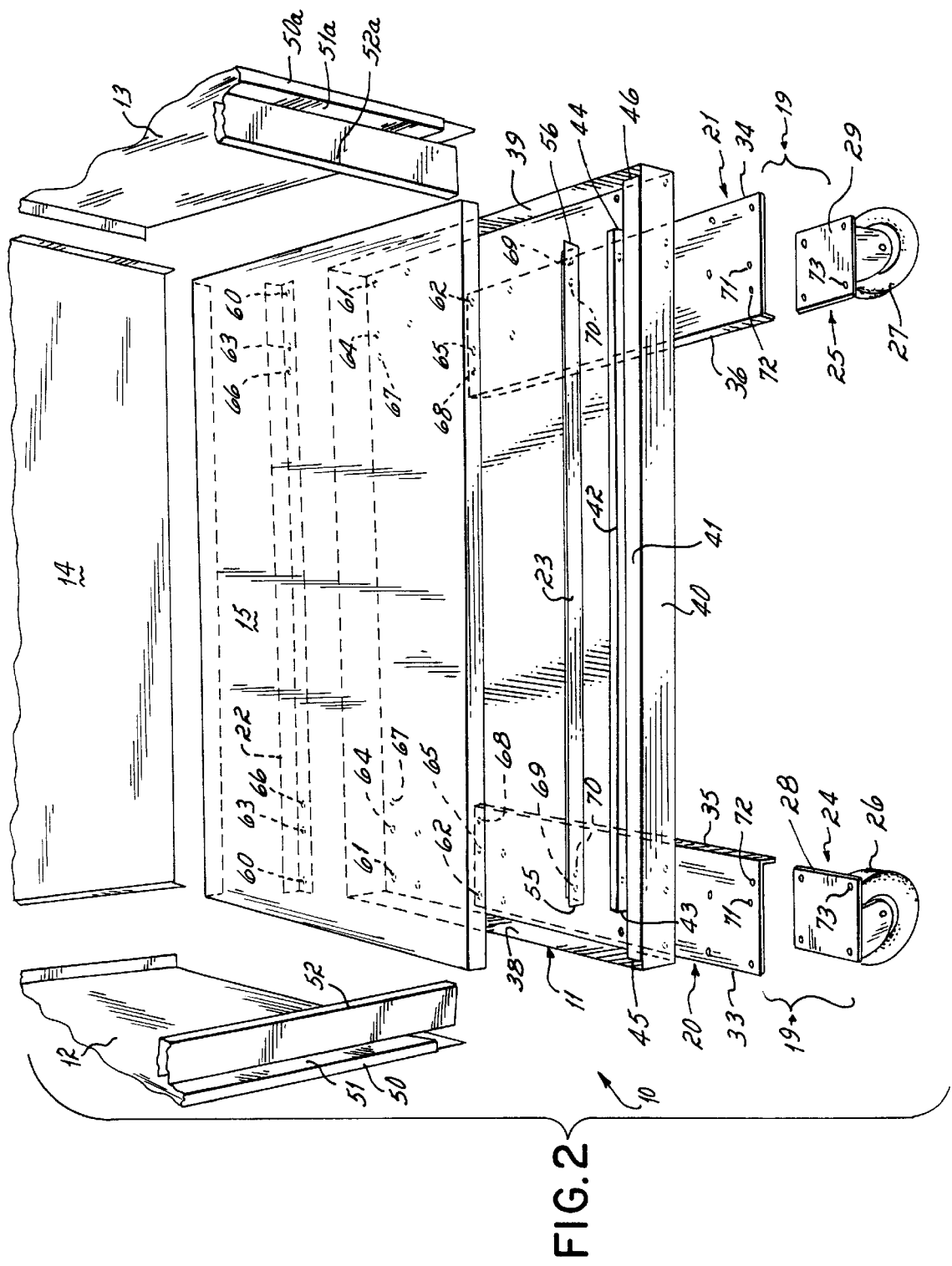
FIG. 2 is an exploded view similar to FIG. 1 showing components of the cabinet and base.

Turning now to the drawings, there is shown in FIG. 1 an integrated cabinet and caster base 10. Reference is made to both FIG. 1 and to FIG. 2 where the cabinet and caster base are shown in exploded form for clarity.

In the Figures, the cabinet includes a bottom 11, left and right side panels 12, 13 and a back panel 14. The cabinet also includes a first lower shelf 15. The base 19 is a multiple component base and includes left and right support plates 20, 21, rearward strut 22 and forward strut 23. Casters 24, 25 are mounted under the left and right front corners of the cabinet and additional casters (not shown) are mounted at the left and right rear corners of the cabinet.

Each caster includes, for example, a wheel 26 or 27 and a base plate 28 or 29, for example, as shown. There is also shown in FIG. 1 a base plate 30 for the left rear corner caster. A similar caster and plate are mounted at the right rear corner of the cabinet. The casters may be of the fixed variety or of the swivel variety or some combination of fixed and swivel type casters of any well known type.

In addition, it will be appreciated that the term "caster" as used herein, is used broadly and includes any downwardly extending support for purposes of supporting a cabinet and may include, for example, wheels, rollers, balls, slides or other members, but preferably those types of members which will accommodate and facilitate movement of the cabinet over a surface, and preferably rolling movement thereof.

Turning now to more details of the base, the support plates 20, 21 each include an outside edge 33, 34 and an inside edge 35, 36. It will be appreciated that the inside edges 35, 36 are turned downwardly for the purpose of stiffening the support plates.

The rear strut 22 as shown extends across the bottom 11 of the cabinet, terminating just shortly of the upturned left and right side flanges 38, 39 thereof. Further defining the bottom 11 of the cabinet is a front forward face 40 extending upwardly across the front of the cabinet, a jamb or frame face 41, and a further configured upwardly standing integral rib 42. It will be appreciated that the forward face 40, the jamb face 41 and the rib 42 are all formed integrally from bent portions of the cabinet bottom, so as to provide a strong structural element extending across the front of the cabinet. It will also be appreciated that the rib 42 extends between its respective ends 43 and 44, which terminate short of the ends 45, 46 of the jamb face.

It will also be appreciated that each of the side panels 12, 13 of the cabinet have a forward marginal portion which defines a front cabinet frame. For example, with respect to the left side panel 12, the panel has a forward edge 50, a return or jamb face 51 and a stiffening rib 52. The forward edge 50, jamb face 51 and rib 52 are all formed integrally from the marginal portion of the side panel 12 by any suitably known bending process. The right side panel 13 is similar, but in mirror image, and similar parts are denoted by similar numbers with an added suffix "a".

Moreover, it will be appreciated that the corner structure formed by the components 50, 51 and 52 (or 50a, 51a and 52a in the case of left side panel 13) extend inwardly from the panel along the front of the cabinet and provide a vertically-extending corner structure which extends downwardly to the bottom 11 of the cabinet.

When the cabinet is constructed, then it will be appreciated that the side panels 12 and 13 extend downwardly to the bottom 11 of the cabinet and that the ribs 52, 52a also extend inwardly toward the rib 42 of front face 40.

Accordingly, it will be appreciated that the rib 42 formed from the bottom 11 of the cabinet extends between and terminates just proximate to the ribs 52, 52a at the respective rib ends 43 and 44.

With further attention to the forward strut 23, it will be appreciated that the strut has ends 55 and 56 which extend between and proximate or adjacent to the ribs 52, 52a when the forward strut 23 is in place on the top side of the bottom 11 of the cabinet.

Turning now to the interconnection of the various components, it will be appreciated that there are preferably at least five holes, preferably drilled or punched, in each of the forward and rearward ends of the support plates 20 and 21. Similarly, there are a like number of holes indexed with these which are drilled in the cabinet bottom 11 so that the respective holes align when the support plate is mounted against the lower or bottom side of the cabinet bottom 11.

In addition, it will be appreciated that the rearward strut at each end has three holes. The outermost hole on each end aligns with the outermost corner hole drilled in the cabinet bottom and the rearward end of the two support plates, while the two innermost holes at each end of the strut 22 align with the aligned innermost holes drilled through the support plate and the cabinet bottom 11.

Thus, hole 60 in the strut 22 aligns with hole 61 in the cabinet bottom and with hole 62 at the rear end of the support plate 20. Likewise, holes 63 in the strut 22, 64 in the cabinet bottom, and 65 at the rear end of the support plate 20 all align. Finally, it will be appreciated that the holes 66 in the strut 22, 67 in the cabinet bottom and 68 at the rear end of the strut 20 all align. The alignment of holes at the right hand side of the strut 22, the right hand side of the cabinet bottom, and the rear end of the support plate 21 similarly align.

Likewise, there is an alignment of respective holes of the forward end of the support plates 20, 21, with the forward end of the cabinet and the forward strut 23. At the forward side of the cabinet, however, the strut 23 only has two holes, such as 69 and 70, which align respectively with the holes 71 and 72 of the strut 20.

It will also be appreciated that the hole 71 in the support plate 20 aligns with the hole 73 in the base plate 28 of the caster assembly 24. A similar alignment of holes at the right side of the cabinet in the forward end of the strut 21 are provided.

Accordingly, each strut is secured by at least one fastener, such as a bolt or a screw, which can extend through at least one hole in the strut, through at least one hole in the cabinet bottom and through at least one hole in the base plate. As shown and as will be appreciated from review of the drawings, each of the struts is also fastened by means of any suitable bolts or screws (not shown) to the caster mounting plate, such as 28, 29 or 30, as shown in the drawings, or the plate on the right back corner of the cabinet, thereby integrating the entire caster base with the cabinet bottom. Thus, the strut, the bottom, the support plates and the caster bases are all secured together by means of appropriate fasteners.

When so secured together, the struts serve to stiffen the cabinet bottom and integrate the base. When the cabinet is heavily loaded, it is strengthened by the front-to-back extension of the support plates 20 and 21, including the downturned stiffening edges 35, 36. As well, the cabinet bottom structure is stiffened against distortion or deformation by the struts 22, 23 which extend across the back and the front of the cabinet bottom and are integrated with both the cabinet bottom and the support plates to strengthen the cabinet from left to right.

Of course, it will be appreciated that the cabinet structures can take on many different configurations, however, as it appears from the figures, the caster support base preferably never extends beyond the outer periphery of the cabinet.

For example, it will be appreciated that the bottom 11 defines an outer periphery of the cabinet. It will also be appreciated that the outer edges 33, 34 of the support plates 20, 21 are aligned with or disposed just interiorly of the sides 12, 13 or, more precisely, the planes in which the side panels 12 and 13 of the cabinet reside.

The forward and rearward edges of these support plates 20, 21 also terminate with the forward and rearward edge of the cabinet bottom 11 so that the support plates are confined within the periphery of the cabinet.

Moreover, it will be appreciated that the struts 22 and 23 are disposed and lie within the cabinet bottom. Accordingly, for cabinets of the same size, the same base may be used, regardless of the color of the cabinet. Stated in another way, it is only necessary to paint or treat the base materials as desired and it is not necessary to match them to the cabinet color, since no portion of the base appears to the casual observer outside of the periphery of the cabinet.

Moreover, the lower shelf 15 is preferably used to cover the cabinet bottom 11 and the struts 22, 23 so that when the cabinet doors are open, there is a very clean appearance.

It will also be appreciated that shelf 15 distributes any load on the shelf out to the edges of the cabinet interior over the support base structure and thus facilitates having heavier loads in the cabinet bottom than if placed on the center of the cabinet bottom 11.

The shelf 15, of course, could be removed if it is desirable to have a recessed cabinet bottom and take advantage of the space all the way down to the bottom of the cabinet.

Finally, it will be appreciated that the side and back panels can be formed and interconnected together in any suitable way, such as by corner folds, interlocking structures or various fasteners. Moreover, it will be appreciated that the side and back panels could be made of more than one sheet of material or panel composite.

These and other features and modifications may be readily appreciated from the foregoing, without departing from the scope or spirit of the invention, and applicant intends to be bound only by the claims appended hereto

What is claimed is:

1. A caster base for a cabinet having a bottom member of sheet metal, said base comprising:

at least two support plates, each having forward and rearward ends;

a caster apparatus mounted proximate each end of each support plate;

a front strut;

a rear strut;

said front strut being shorter than said rear strut;

said front strut being adapted to be disposed inside said cabinet and said front strut being connected to the respective forward ends of each support plate by a first set of fasteners extending only through a respective said support plate, bottom member and front strut and second set of fasteners extending through a respective said caster apparatus a respective support plate, bottom member and a respective strut, respectively;

said rear strut being adapted to be disposed inside said cabinet and said rear strut being connected to the respective rearward ends of each support plate by fasteners extending through said support plates, bottom member and rear strut, respectively;

wherein when said base is combined with said cabinet, said struts are disposed on one face of said bottom member and said support plates are disposed on another opposite face of said bottom member.

2. A cabinet and a caster base, including a plurality of casters, fitted to said cabinet;

said cabinet having a bottom member with two opposing faces, a back panel, and two opposite side panels defining a cabinet interior with a front opening opposite said back panel;

said caster base having two support plates and two struts wherein said plates and said struts are separate pieces independent of said cabinet;

said cabinet bottom member being disposed between said struts on one of said faces of said bottom member and said support plates on another of said faces of said bottom member; and fasteners extending through the support plates, bottom member and struts for interconnecting ends of said struts with ends of said support plates with said bottom member being captured therebetween, said casters being mounted on said support plates with said fasteners whereby loads from the cabinet are distributed across the caster base to said plurality of casters.

3. In combination, a sheet metal cabinet and a caster base therefor, said sheet metal cabinet including a bottom member and said base comprising:

at least two support plates, each having forward and rearward ends;

a caster apparatus mounted proximate each end of each support plate;

a front strut;

a rear strut;

said front strut being shorter than said rear strut;

said cabinet bottom member being disposed on top surfaces of said support plates;

said struts being disposed on a top surface of said cabinet bottom member opposite said support plates;

said front strut being connected to and between respective forward ends of said support plates from inside said cabinet;

said rear strut being connected to and between respective rearward ends of said support plates;

said cabinet bottom member being disposed between and adjacent said respective struts and said support plates:

a first set of fasteners extending only through said support plates, said bottom member and said struts, but not through said caster assembly; and a second set of fasteners extending through a respective said caster apparatus, a respective support plate, bottom member, and strut.

4. The combination of claim 3 wherein said respective casters each have a base plate connected to a respective support plate and further including at least one fastener extending through each end of each support plate, the cabinet bottom member and an end of a respective one of said struts.

5. The combination of claim 4 including at least one additional fastener extending through each end of a caster base plate, support plate, the cabinet bottom member and an end of a respective one of said struts.

6. The combination of claim 5 wherein said struts comprise elongated members having edges turned upwardly away from said cabinet bottom member.

7. The combination of claim 3 further including an interior cabinet shelf disposed over and proximate to said cabinet bottom and said struts.

8. The combination of claim 3 wherein said cabinet has an outer periphery defined in part by said bottom and wherein said support plates and struts are disposed within said periphery.

9. The combination of claim 3 wherein at least one of said struts comprise an angular strut having two flanges.

10. The combination of claim 3 wherein said support plates include a longitudinal marginal edge bent downwardly from said bottom member.

11. A cabinet and a caster base, including a plurality of casters, fitted to said cabinet;

said cabinet having a bottom member with two opposing faces;

said caster base having two support plates and two struts which are independent of said cabinet;

said cabinet bottom member being disposed between said struts on one of said faces of said bottom member and said support plates on another of said faces of said bottom member;

fasteners extending through the support plates, bottom member and struts for interconnecting ends of said struts with ends of said support plates with said bottom member being captured therebetween, said casters being mounted on said support plates with said fasteners whereby loads from the cabinet are distributed across the caster base to said plurality of casters; and wherein said cabinet has inwardly-extending front corner structures extending upwardly from a position proximate said bottom member and wherein a forward one of said struts is shorter than a rearward one of said struts and extends proximate to and between the inwardly-extending front corner structures.

12. In combination, a cabinet and a caster base therefor, said cabinet including a bottom member and said base comprising:

at least two support plates, each having forward and rearward ends;

a caster mounted proximate each end of each support plate;

a front strut;

a rear strut;

said cabinet bottom member being disposed on top surfaces of said support plates;

said struts being disposed on a top surface of said cabinet bottom member opposite said support plates;

said front strut being connected to and between respective forward ends of said support plates from inside said cabinet;

said rear strut being connected to and between respective rearward ends of said support plates; and said cabinet bottom member being disposed between and adjacent said respective struts and said support plates;

wherein said cabinet includes right and left side panels, each panel having a forward marginal portion defining a front corner structure of said cabinet, each said front corner structure extending inwardly from said side panels along the front of said cabinet and extending downwardly to said cabinet bottom member;

said front strut extending between and proximate to said front corner structures and being shorter than said rear strut.

13. The combination of claim 12 wherein said struts are disposed within said cabinet.

14. The combination of claim 13 wherein said support plates each have an outer edge, said cabinet side panels lying in respective planes and each support plate outer edge terminating within a respective one of said planes.

15. The combination of claim 12 wherein said cabinet bottom has a forward marginal portion defining a lower front wall of said cabinet, said forward strut being disposed proximate to and parallel to said lower front wall.

16. A cabinet including a bottom member;

two support plates;

a forward strut;

a rearward strut;

four casters, each including a caster roller and a caster mounter plate;

said caster mounting plates each having a bolt pattern of holes;

said cabinet bottom having a pattern of holes in register with said caster plate holes at four respective corners of said bottom member;

said support plates each having a pattern of holes aligning with the holes in the caster plates and in the bottom member;

said forward and rearward struts each having, at each end, at least one hole aligned with a hole in said patterns and one hole out of alignment with all holes in said caster plate, whereby said struts, support plates and bottom member can be fastened together without being unfastened when said caster plates are later secured to said cabinet; and wherein said rearward strut is longer than said forward strut.

17. A cabinet as in claim 16 wherein said rearward strut includes at least two holes in each end in operative alignment with at least two holes in said respective patterns.

* * * * *